United States Patent [19]

Kugler et al.

[11] Patent Number: 4,615,212
[45] Date of Patent: Oct. 7, 1986

[54] TORQUE TEST APPARATUS

[75] Inventors: Artur Kugler; Anton Roth, both of Augsburg, Fed. Rep. of Germany

[73] Assignee: Zahnraderfabrik Renk, A.G., Augsburg, Fed. Rep. of Germany

[21] Appl. No.: 750,917

[22] Filed: Jul. 1, 1985

[30] Foreign Application Priority Data

Jul. 6, 1984 [DE] Fed. Rep. of Germany ....... 3424923

[51] Int. Cl.$^4$ .......................................... G01M 13/02
[52] U.S. Cl. ..................... 73/162; 73/118.1
[58] Field of Search ......................... 73/162, 118, 847; 74/395; 474/900

[56] References Cited

U.S. PATENT DOCUMENTS 2,981,103 4/1961 Livezey ................................. 73/162
3,690,168 9/1972 Petersen ............................... 73/162

FOREIGN PATENT DOCUMENTS 1573682 4/1970 Fed. Rep. of Germany.
3100848 1/1984 Fed. Rep. of Germany.

OTHER PUBLICATIONS

ATZ Journal, 1963, No. 8, Aug. 1961, pp. 239–242.

Primary Examiner—Jerry W. Myracle
Attorney, Agent, or Firm—Natter & Natter

[57] ABSTRACT

A torque test apparatus for testing components such as gears, clutches and universal joints includes a pair of spaced transmissions interconnected to each other through a pair of connecting links to form a closed mechanical energy circuit. One or both of the links carries a test specimen and at least one transmission gear includes a coaxial twist coupling which is rotatable relative to the gear. The twist coupling includes a core coupled to the specimen. The twist coupling core is seated within the gear. A plurality of vanes project from the core and abut the inner surface of the gear. The gear includes vanes projecting inwardly and abutting the core. A hydraulic system selectively applies pressurized fluid to the spaces between the vanes to cause the core to rotate relative to the gear and apply a torque or twist load to the specimen.

18 Claims, 7 Drawing Figures

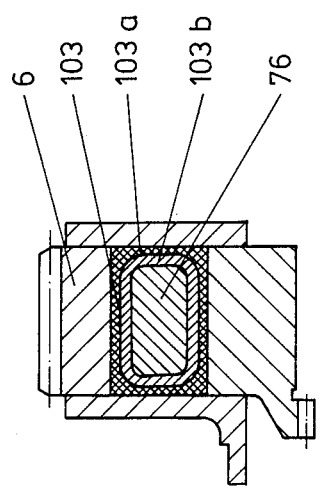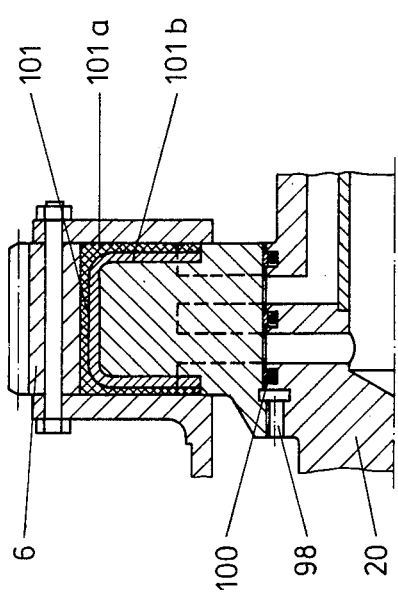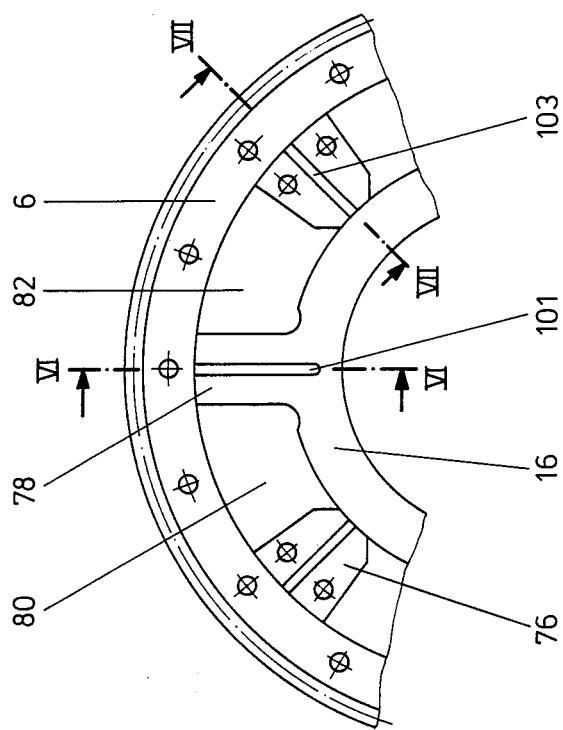

TORQUE TEST APPARATUS

FIELD OF THE INVENTION

The present invention relates generally to testing apparatus for mechanical components subject to torque loads and more particularly to a torque test apparatus having a pair of transmissions forming a mechanical energy circuit and a twist coupling for applying controlled torque loads to the specimen.

BACKGROUND ART

Various devices have been employed for testing mechanical transmission components. Many testing devices have attempted to simulate actual running load conditions. With respect to torque transmitting components, a typical testing apparatus has been disclosed in U.S. Pat. No. 2,981,103 issued Apr. 25, 1961 to W. G. Livezey. The apparatus disclosed in such patent provided a closed type drive system in which the input and output for the apparatus were interconnected. Systems of such type generally included two transmissions interconnected by two connecting lines with the specimen component being positioned within one of the connecting lines and with the apparatus further including a torque applier which induced a torque or twist to the system.

Testing apparatus of this general nature for inducing torque strains on a test specimen were also disclosed in German patent document E-OS No. 15 73 682 which illustrated a torque testing apparatus in which the shafts of the two transmissions were mutually offset to provide testing torque loads for components such as universal joint shafts. Such apparatus thus provided a simulation of operating conditions wherein a universal joint shaft rotated at certain offset angles. In addition, torque testing apparatus of this general type was also disclosed in the Journal, ATZ 1963, no. 8, August 1961, at pages 239 through 242.

Typical torque transmitting components suitable for testing with the apparatus heretofore disclosed included mechanical transmission or drive components such as shafts, clutches, joints, gears, and the like. During a testing procedure, test specimens were acted upon in the testing apparatus by changing loads during a test run according to a predetermined testing program. Ideally, the components were tested under stress conditions which truly simulated actual running load conditions in usage.

The specimen components were required to have an induced torsional stress which possibly was very high, while the driving power required to rotate the specimen component was relatively small.

Ideally, a testing apparatus should have the capability of applying torque loads to the specimen when the specimen is not rotating and in addition to apply torque loads to a rotating component with random changes in intensity and direction.

Generally, the torque test apparatus heretofore known have been subject to significant disadvantages. In order to generate the requisite torque loads, relatively complicated torque appliers were employed. Such devices necessarily included housings, hollow shafts and bearings and were relatively large in mass to provide requisite torsional rigidity. For example, the torque applier of U.S. Pat. No. 2,981,103 included multiple planetary gear sets, clutch assemblies and brake assemblies. In devices of this nature it was inherently difficult to provide rapid changes in direction of applied torque, rapid speed changes, and other true load conditions in simulation of actual usage. In addition, the induced torque load from the torque applier to the test specimen in U.S. Pat. No. 2,981,103 was transmitted through a pair of pinions, a pair of shafts and a torque meter. By providing such indirect and lengthy transmission route, torque loads in true simulation of actual conditions were difficult to achieve and the possibility of twist deflection occurring in the route between the torque applier and the test specimen was present.

SUMMARY OF THE INVENTION

In compendium, the invention comprises a torque testing apparatus for simulating torque loads under actual usage conditions of mechanical rotary transmission or drive components. The apparatus includes a closed mechanical energy drive circuit in which the input and the output of the apparatus are interconnected.

The apparatus includes a pair of spaced transmissions interconnected with each other by a pair of connecting links with one of the links constituting or carrying a test specimen. Torque loads are applied to the test specimen through a twist coupling which is incorporated in at least one of the transmissions. The twist coupling is integrated with a hollow gear of one of the transmissions. Concentrically seated within the hollow gear is a core of the twist coupling. A plurality of vanes project from the core and abut the inner surface of the hollow gear, while a further plurality of vanes project inwardly from the follow gear and abut the core. The core is coupled to the specimen over the shortest possible transmission route.

Through a hydraulic system which selectively delivers pressurized fluid to spaces between the vanes, the core is caused to rotate about its axis in either direction relative to the hollow gear and apply a torque or twist load to the test specimen.

From the foregoing summary, it will be appreciated that it is an aspect of the present invention to provide a torque test apparatus of the general character described which is not subject to the disadvantages of the background art aforementioned.

It is a further aspect of the present invention to provide a torque test apparatus of the general character described which is capable of providing true simulations of torque loads encountered during actual component usage.

A further consideration of the present invention is to provide a torque test apparatus of the general character described which is capable of inducing rapid variations in torque load, rotational speed and direction such as may occur in acceleration, deceleration, and gear shifting during motor vehicle operation.

It is a further feature of the invention to provide a torque test apparatus of the general character described which is capable of applying various torque loads in simulation of actual running conditions on a test specimen in accordance with set values of a predetermined test program.

A further consideration of the present invention is to provide a torque test apparatus of the general character described which is relatively low in cost and capable of economical mass production fabrication.

An additional feature of the present invention is to provide a torque test apparatus of the general character described which is of relatively low mass and compact in design, yet capable of inducing high torque stresses upon a specimen without bending.

An additional aspect of the present invention is to provide a torque test apparatus of the general character described which includes a twist coupling for inducing torque loads upon a specimen with the coupling being integrated in a gear of a closed mechanical energy circuit.

A further consideration of the present invention is to provide a torque test apparatus of the general character described which includes a twist coupling integrated in a gear of a closed mechanical energy circuit and including a core accommodated coaxially within the gear and which is rotatable relative to the gear through a hydraulic system.

Another feature of the present invention is to provide a torque test apparatus of the general character described which is capable of testing specimens at relatively high speeds such as may be encountered in actual operation of automotive components which rotate at speeds of up to 8000 revolutions per minute without being susceptible to bending vibrations.

An additional feature of the present invention is to provide a torque testing apparatus of the general character described which applies a torque force load to a test specimen over a short force transmission route.

A further feature of the present invention is to provide a torque testing apparatus of the general character described which is capable of testing a plurality of components simultaneously.

An additional aspect of the present invention is to provide a torque test apparatus of the general character described which is capable of generating extremely short shocks and high frequency vibrations and transmitting such stresses to a test component without variation.

Other aspects, features and advantages of the present invention in part will be obvious and in part will be pointed out hereinafter.

With these ends in view, the invention finds embodiment in the various combinations of elements, arrangements of parts and series of steps by which the invention is achieved, all with reference to the accompanying drawings and the scope of which is more particularly pointed out and indicated in the appended claims.

BRIEF DESCRIPTION OF THE DRAWINGS

In the accompanying drawings in which are shown some of the various exemplary embodiments of the invention:

FIG. 5 is a fragmentary auxiliary view of the twist coupling core and its gear and illustrating vanes projecting from the core toward the gear as well as vanes projecting from the gear toward the twist coupling core;

FIG. 6 is a sectional view through the twist coupling and its gear, the same being taken substantially along the line 6—6 of FIG. 5 and illustrating a seal structure associated with the vanes projecting from the core; and FIG. 7 is a sectional view taken substantially along the line 7—7 of FIG. 5 and illustrating a seal associated with the vanes projecting inwardly from the gear.

DESCRIPTION OF THE PREFERRED EMBODIMENTS

Figure 1:
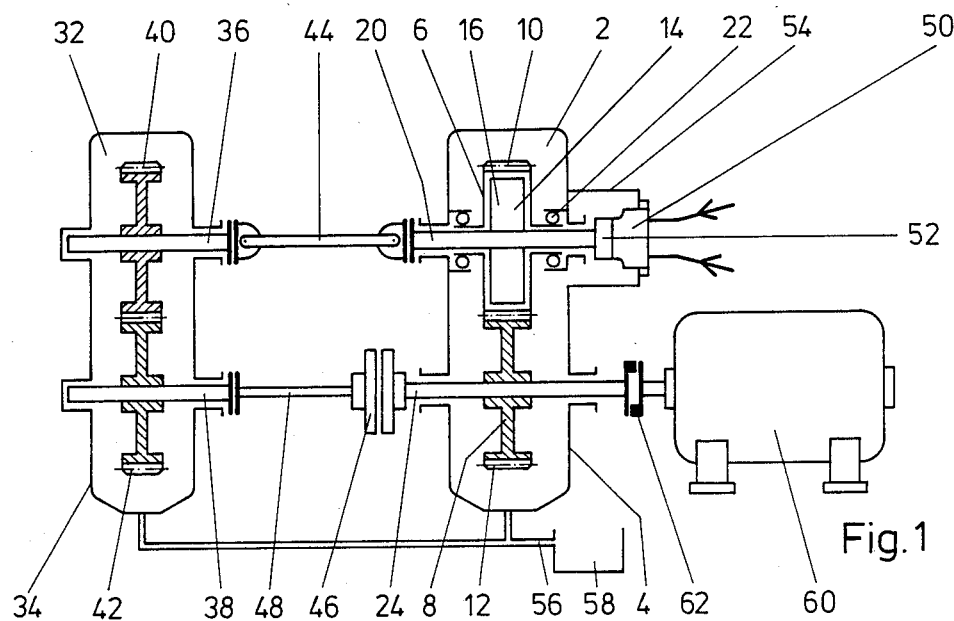
FIG. 1 is a schematized illustration of a torque test apparatus constructed in accordance with and embodying the invention and illustrating a closed mechanical energy circuit including a pair of interconnected transmissions and a twist coupling integrated in a gear of one of the transmissions.

Referring now in detail to FIG. 1 of the drawings which schematically illustrates a torque test apparatus in accordance with the invention, it will be seen that the torque test apparatus comprises a closed mechanical energy circuit including a first transmission 2 and a second transmission 32, the inputs and outputs of which are interconnected. A torque windup or twist is induced into the system when one of two adjacent members is rotated with respect to the other. Pursuant to the present invention and as will be subsequently explained, a twist coupling is employed for providing such relative rotation.

The first transmission 2 is carried within a gear box or housing 4 and includes a pair of interengaged gears 6, 8 having mutually intermeshed toothed rims 10, 12, respectively. Integrated with the gear 6 is a twist coupling denoted generally by the reference numeral 14 and the gear 6 itself forms an outer portion of the twist coupling 14. An inner core 16 of the twist coupling 14 is carried coaxially within a hollowed interior portion of the gear 6 and, in accordance with the invention, is capable of rotating relative to the gear 6 and thus inducing twist into the closed energy circuit of the torque test apparatus. The gear 6 is mounted for rotation relative to the transmission housing 4 through a pair of bearings 22, while the twist coupling core 16 is mounted to a shaft 20 which extends through the bearings 22 and projects through both sides of the housing 4. The reamining gear 8 is mounted to a shaft 24 which also extends through both sides of the housing 4.

With respect to the second transmission 32, such transmission includes a housing 34 which carries a pair of interengaged gears 40, 42 having meshing toothed rims. The gears 40, 42 are each mounted to a shaft 36, 38, respectively, with the axes of the shafts 36, 38 being parallel to one another. The shafts 36, 38 project through the housing 34 on a side of the housing which faces the first transmission 2.

The shafts 20, 24 of the first transmission 2 are axially aligned with the shafts 36, 38, respectively, of the second transmission 32. The aligned shafts 20, 36 and 24, 38 are interconnected through a pair of connecting links 44, 46, respectively. In the exemplary embodiment of FIG. 1, the connecting link 44 comprises a test specimen which constitutes a universal joint shaft and the connecting link 46 includes an elastic coupling test specimen which is directly connected to the shaft 24 and connected to the shaft 38 through a suitable coupling shaft 48.

It will thus be observed that the inputs and the outputs of the first transmission 2 and the second transmission 32 are interconnected to one another through the connecting links 44, 46 to provide a closed mechanical energy circuit.

An electric motor 60 is connected to the closed mechanical energy circuit through a clutch 62 which interconnects the output shaft of the motor 60 to the shaft 24 and hence the gear 8. The motor 60 serves to rotate the transmission 2, 32 and the test specimens at speeds to be encountered during actual usage of the test components.

Returning now to the twist coupling 14, as will be explained in greater detail hereinafter, the gear 6 and the twist coupling core 16 can be rotated with respect to one another in a circumferential direction through the use of hydraulic fluid as a pressure medium which varies the size of spaces or chambers defined by the inner circumference of the gear, the outer circumference of the core and radial vanes which project from both.

The hydraulic fluid is supplied from a feeder 50 which is mounted on the transmission housing 4 and which engages a rotating coupling 52. The coupling 52, in turn, is mounted to and rotates with the shaft 20. The hydraulic fluid is supplied through the feeder 50, the coupling 52, and the shaft 20 and is eventually selectively directed into the spaces or chambers of the twist coupling to cause the relative rotation between the gear 6 and the core 16.

The feeder 50 is fixedly mounted to the housing 4 in a fluid tight subhousing 54, the interior of which is in communication with the interior of the housing 4. Such structure facilitates a simplified fluid connection for the collection of excess, leaking and/or drainage oil. Any leaking hydraulic fluid of the feeder 50 or the rotating coupling 52 will drain into the housing 4 and collect at a lower portion of the housing 4 together with any oil leaking from the twist coupling 14, as well as lubricating oil of the transmission to itself. Such oil or hydraulic fluid, as well as any lubricating oil of the second transmission 32 then flows through a single return oil line 56 into a common reservoir 58 to be returned to an oil circulation system for return as a transmission lubricant and/or return to the feeder 50.

Figure 2:
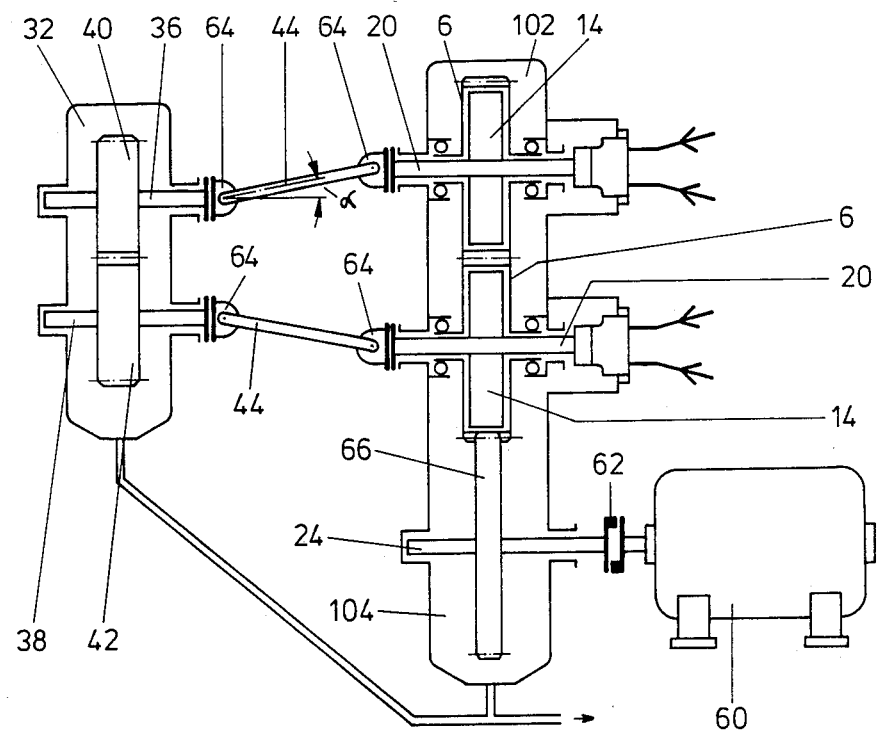
FIG. 2 is a schematized illustration of a further embodiment of the invention wherein the transmissions of the closed energy circuit are not axially aligned and wherein multiple twist couplings are employed.

In FIG. 2 an alternate embodiment of the torque test apparatus is illustrated. In this embodiment, a torque test apparatus comprises a closed mechanical energy circuit including a first transmission 102 of modified configuration and a second transmission 32 substantially identical to the second transmission of the prior embodiment and including a pair of interengaged gears 38, 40. The torque test apparatus is illustrated, in an exemplary manner, as being set up for testing a pair of universal joint shafts 44 which are positioned within the two connecting links extending between the inputs and the outputs of the two transmissions 102, 32.

The first transmission 102 includes a pair of interengaged gears, both being designated by the reference numeral 6 and each of which is substantially identical to the gear 6 of the prior embodiment. Each of the gears 6 includes a twist coupling 14 integrated with its respective gear and a hydraulic control system for providing relative rotation between a twist coupling core and the gear 6.

The distance between the axes of the two shafts 20 to which the twist coupling cores are mounted is greater than the distance between the axes of a pair of shafts 36, 38 of the transmission 32. As a result, the test specimen universal joint shafts 44 operate at a predetermined oblique angle $\alpha$ relative to the axes of the shafts 36, 20 and 38, 20 to which they are connected.

A pair of universal joints 64, each mounted to one end of one of the universal joint shafts 44, are thus subject to constant angular motion when the closed mechanical energy circuit formed by the universal joint shafts 44 and the two transmissions 102, 32 is driven. An electric motor 60 drives the closed energy circuit through a clutch 62 and a drive pinion 66 which engages rim teeth of one of the gears 6. The drive pinion 66 is fixed to a shaft 24 and mounted within a transmission housing 104 in a manner similar to that of the gear 8 of the prior embodiment.

Due to the implementation of two twist couplings 14 in the transmission 102, it is possible to generate and induce a much greater torque windup, twist or torsion angle into the closed mechanical energy circuit than would be possible with only a single twist coupling 14. This feature of the alternate embodiment is of significance when components to be tested have relatively high rotary elasticity. Even greater torsion angles, windup or twist may be induced into the closed mechanical energy circuit by replacing the gears 40, 42 of the second transmission 32 with twist couplings in a manner identical to the gears 6 of the transmission 102 without, however, employing a pinion 66.

Figure 3:
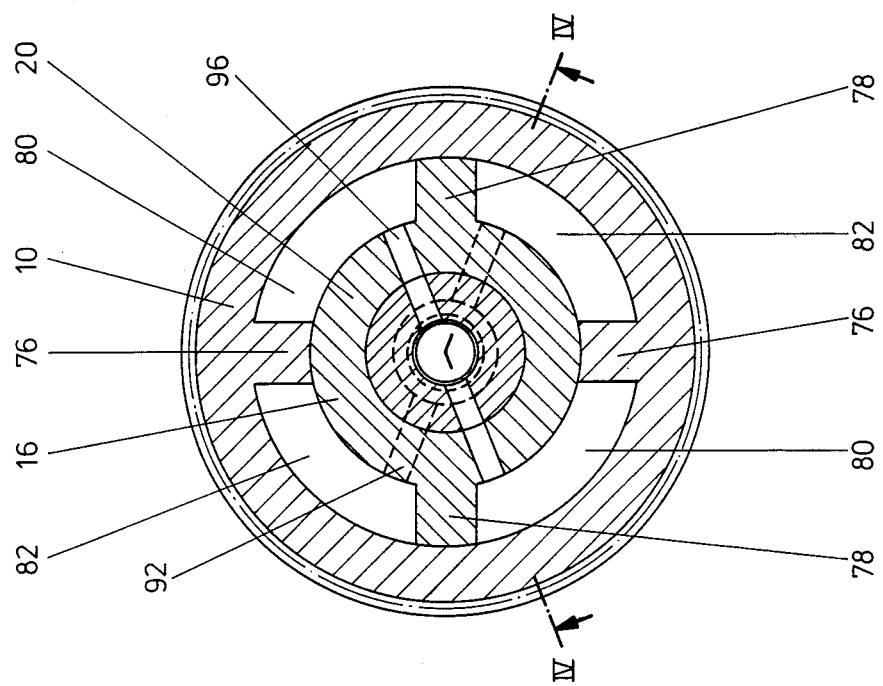
FIG. 3 is an enlarged transverse sectional view through the twist coupling and its gear as illustrated in FIG. 1 and showing the hollow interior of the gear and a core of the twist coupling which is capable of rotating relative to the gear to induce torque loads on a specimen.
Figure 4:
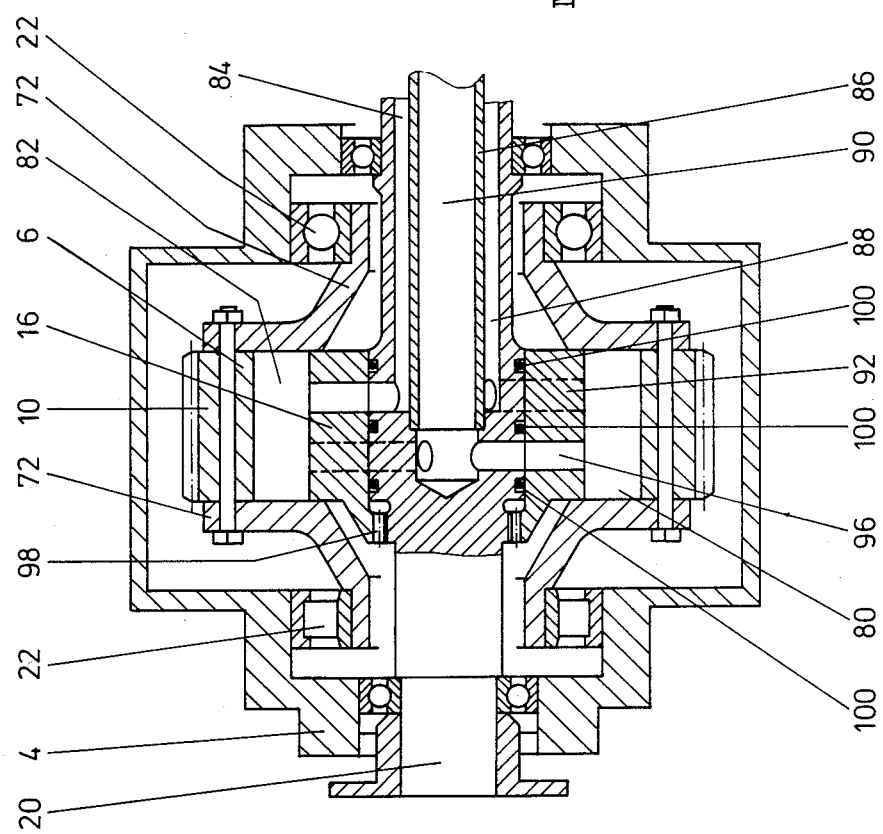
FIG. 4 is a sectional view through the twist coupling, its gear and a transmission casing, the same taken substantially along the line 4—4 of FIG. 3 and illustrating flow delivery lines for hydraulically rotating the twist coupling core relative to the gear.

Referring now to FIGS. 3 and 4 wherein details of the structure of the twist coupling 14 are illustrated, it will be seen that the gear 6 comprises a hollow toothed rim or ring 10 having external teeth and a pair of annular side plates 72 which are secured to one another through the rim 10 by a plurality of bolts. The gear 6 is mounted for rotation in the bearings 22 by engagement between hub portions of the side plates 72 and the bearings 22.

The twist coupling 14 which is integrated with the gear 6 comprises a composite structure wherein the gear 6 functions as a torsion element located radially outside of and interacting with the twist coupling core 16. The twist coupling core 16 may be rotated in both directions relative to the gear 6. To facilitate such rotation, the gear 6 includes, in an exemplary manner, a pair of diagonally opposite radially inwardly projecting vanes 76 and the twist coupling core 16 includes a pair of diagonally opposite radially outwardly-projecting vanes 78. As will be observed from FIGS. 3 and 5, the vanes 76, 78 form, in opposite rotary directions, end walls of pressure chambers or spaces 80, 82. The spaces or chambers are defined by the vanes 76, 78, the interior periphery of the gear 6 and the exterior periphery of the twist coupling core 16.

Utilizing at least one chamber or space 80 and one chamber or space 82, the twist coupling core 16 can be turned alternately in one or the other direction of rotation relative to the gear 6 by applying hydraulic pressure alternately to the two chambers or spaces 80, 82. The chambers or spaces 80 are effective when pressurized fluid is applied thereto to cause relative rotation in one torsional direction while the chambers or spaces 82 are active when pressurized fluid is applied thereto to cause relative rotation in the opposite torsional direction.

It will be observed from FIG. 2 that the twist coupling core 16 is fixed to and rotates with the shaft 20. Referring now to FIG. 4, a portion of the shaft 20 is hollow extending from an enlarged diameter zone in registry with the core 16 toward the right. The hollow portion includes an axial bore 84 and, coaxially therein, a smaller diameter feed tube 86. The bore 84 and the feed tube 86 form, within the shaft 20, two coaxial passages 88, 90, respectively, which communicate with the stationary hydraulic fluid feeder 50 through the coupling 52.

Fluid passageways are formed in the twist coupling core 16 by radial bores 92, 96 which extend from the chambers or spaces 82, 80 to the passages 88, 90. The passage 90 of the feed tube 86 communicates flowwise with the chambers 80 through a pair of bores 96, and the passage 88 of the shaft 20 communicates flowwise with the pressure chambers 82 through the bores 92.

In order to provide an effective seal with small hydraulic fluid losses, the twist coupling core 16 must rotate with very little clearance in the gear 6 which functions as an outermost clamping element. A rigid connection between the shaft 20 and the twist coupling core 16 would lead to jamming of the components of the twist coupling and various resulting malfunctions. Displacements or distortions could result due to tooth forces on the toothed rim 10 of the gear 6 which functions as a torsion element of the twist coupling 14 and also due to out-of-balance forces of the test specimen 44 or due to other factors. To prevent such malfunctions, in lieu of a fixed rigid coupling between the shaft 20 and the twist coupling core 16, the shaft 20 includes a toothed rim 98 which is drivingly interconnected to the core 16 through a mating internal toothed rim formed on the core 16. Such toothed interconnection provides for limited articulation between the core 16 and the shaft 20.

Since the hydraulic fluid passages 88, 90 are mutually concentric, they can be utilized for relatively large hydraulic fluid flow rates. In addition, because the radial bores 92, 96 which extend from the passages to the chambers or spaces are axially offset from one another, high pressure annular sealing rings 100 may be positioned between the relatively large annular space between the core 16 and the shaft 20 and thus relative motion between such components is accommodated.

In order to generate the requisite torque loads at the twist coupling, relatively high hydraulic pressures are required, in the order of 100 bar to 300 bar. Such pressures necessitated appropriate twist coupling seals. Turning now to FIGS. 5, 6 and 7 wherein details of seals for the chambers or spaces 80, 82 are illustrated, it will be observed that high pressure seals 101 are inserted in appropriate slots formed in the vanes 78 of the core 16. Similarly, high pressure seals 103 are inserted in slots of the vanes 76 of the gear 6. The high pressure seal 101 seated within a slot formed in each vane 78 comprises a U-shaped seal 101a formed of a suitable plastic having low friction characteristics for sliding relative to the gear 6 and a compressible sealing rope 101b positioned beneath the U-shaped seal and compressed due to structural preloading.

Positioned within slots formed in the vanes 76 of the gear 6 are the rectangular high pressure seals 103 which are constructed of an outer rectangular seal 103a also formed of a plastic having low frictional characteristics and an inner sealing rope 103b. In the auxiliary view of FIG. 5 wherein the side plate 72 of the gear 6 has been removed, the slots within which the seals 103 are seated are visible. Also illustrated are apertures formed in the vanes 76 and through which bolts which clamp the side plates 72 to the rim 10 and vanes 76 pass.

As previously mentioned, high pressure sealing rings 100 tightly seal the annular space or gap between the shaft 20 and the core 16. Such space must not fall below a certain predetermined clearance size to assure freedom of motion of the twist coupling core 16. Any of a variety of commercially available high pressure seals may be employed as the sealing rings 100.

Thus, it will be seen that there is provided a torque test apparatus which achieves the various aspects, features and considerations of the present invention and is well suited to meet the conditions of practical usage.

Since various possible embodiments might be made of the present invention or various changes might be made in the exemplary embodiment set forth, it is to be understood that all materials shown and described in the accompanying drawings are to be interpreted as illustrative and not in a limiting sense.

Having thus described the invention, there is claimed as new and desired to be secured by Letters Patent:

1. A low mass torque test apparatus for applying torque stress loads to a test specimen component in simulation of loads encountered in actual operation of the component, the apparatus comprising a pair of transmissions, a pair of connecting means interconnecting the inputs and outputs of the transmissions to provide a closed mechanical energy circuit, at least one of the connecting means including means for carrying the test specimen, one transmission including at least one gear, twist coupling means, the twist coupling means being positioned within the one gear, the twist coupling means including a first torsion element and a second torsion element, means nonrotatively coupling the first torsion element to the means for carrying the specimen, means nonrotatively coupling the second torsion element to the one gear, means for twisting the torsion elements relative to one another, the means for twisting the torsion elements including means forming receptacles for receiving hydraulic fluid, the apparatus further including means for selectively applying hydraulic fluid to the receptacles.

2. A torque test apparatus constructed in accordance with claim 1 further including articulated means for coupling the first torsion element to the connecting means having the means for carrying the test specimen, the coupling means including means forming a toothed interengagement between the first torsion element and the test specimen connecting means.

3. A torque test apparatus constructed in accordance with claim 1 wherein the receptacles are positioned between the torsion elements, the receptacles including means forming variable dimensions, the variable dimensions being defined by boundary elements which are displaceable in a rotary direction.

4. A torque test apparatus constructed in accordance with claim 3 wherein each receptacle includes two boundary elements, one boundary element being fixed relative to the first torsion element and the other boundary element being fixed relative to the one gear.

5. A torque test apparatus constructed in accordance with claim 4 wherein the one gear includes means forming a hollow interior, the first torsion element comprising a core disposed within the gear, the boundary elements comprising at least one vane projecting radially outward from the core and at least one vane projecting radially inward from the gear.

6. A low mass torque test apparatus constructed in accordance with claim 4 wherein the other boundary element comprises the second torsion element.

7. A torque test apparatus constructed in accordance with claim 1 further including a shaft, means coaxially coupling the shaft to the first torsion element, means forming concentric fluid passageways in the shaft and means interconnecting the fluid passageways with the receptacles whereby hydraulic fluid is directed to the receptacles for inducing twist into the circuit.

8. A torque test apparatus constructed in accordance with claim 7 wherein the fluid passageways within the shaft are coaxial to each other and the means interconnecting the passageways with the receptacles extend radially, one passageway being in hydraulic flow communication with one of the receptacles through at least one of the connecting means and the other passageway being in hydraulic flow communication with the other receptacle through the other connecting means, the one connecting means being axially displaced with respect to the other connecting means.

9. A torque test apparatus constructed in accordance with claim 1 wherein the one gear includes means forming a hollow interior, the first torsion element comprising a twist coupling core, the core being disposed within the gear, the apparatus further including means for mounting the gear and the core coaxially.

10. A torque test apparatus constructed in accordance with claim 1 wherein each transmission includes at least one output shaft and at least one input shaft, the axes of the output and input shafts of one transmission being spaced from one another a distance different than that of the other transmission, the connecting means which includes means for carrying the test specimen being interconnected to selected input and output shafts of the two transmissions, and the test specimen including articulated joints, the articulated joints including parts mutually offset by less than 180 degrees during rotation of the connecting means.

11. A torque test apparatus for inducing torque stress loads constructed in accordance with claim 1 further including electric motor means, and means drivingly interconnecting the electric motor means and one of the transmissions for rotating the closed mechanical energy circuit.

12. A torque test apparatus constructed in accordance with claim 1 wherein both connecting means include means for carrying a separate test specimen whereby a plurality of specimens may be simultaneously tested.

13. A low mass torque test apparatus constructed in accordance with claim 1 wherein the means nonrotatively coupling the first torsion element to the specimen provides a direct coupling free of torque cells.

14. A method of inducing variable torque loads to a test specimen in a closed mechanical energy circuit while minimizing test apparatus mass, the mechanical energy circuit comprising a pair of gear transmissions, a pair of connecting means interconnecting the inputs and outputs of the transmissions, at least one of the connecting means carrying the test specimen, the method including the steps of:
(a) providing a hollow gear in one transmission;
(b) providing a concentric core within the hollow gear;
(c) nonrotatively interconnecting the core with the specimen;
(d) drivingly interconnecting the hollow gear with a further gear of the one transmission; and
(e) rotating the core relative to the hollow gear.

15. A method of inducing torque loads to a test specimen in accordance with claim 14 wherein the core is rotated relative to the hollow gear through the application of pressurized hydraulic fluid.

16. A method of inducing torque loads to a test specimen in accordance with claim 14 wherein the core includes outwardly projecting radial vanes, the hollow gear includes radially inwardly projecting vanes, and the step of rotating the core relative to the hollow gear includes:
(i) applying pressurized hydraulic fluid to a selected space bounded by one vane of the core and one vane of the hollow gear.

17. A method of inducing torque loads to a test specimen in accordance with claim 16 wherein the step of rotating the core relative to the hollow gear includes the further steps of:
(ii) terminating the application of pressurized hydraulic fluid to the space and interconnecting such space with a drain; and
(iii) reversing the torque load applied to the specimen by interconnecting a different space bounded by a vane of the core and a vane of the gear with pressurized hydraulic fluid.

18. A method of inducing variable torque loads to a test specimen in accordance with claim 17 further including the step of;
(iv) cyclically reversing the application of pressurized hydraulic fluid to the spaces.

* * * * *